Aug. 9, 1927.
H. V. VAN NUYS
1,638,464
EXHIBITOR
Filed June 11, 1925
2 Sheets-Sheet 2
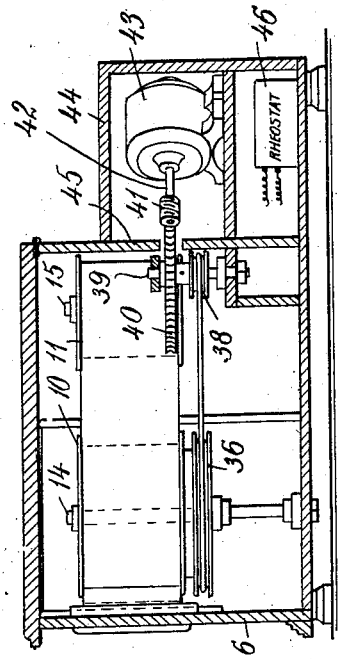
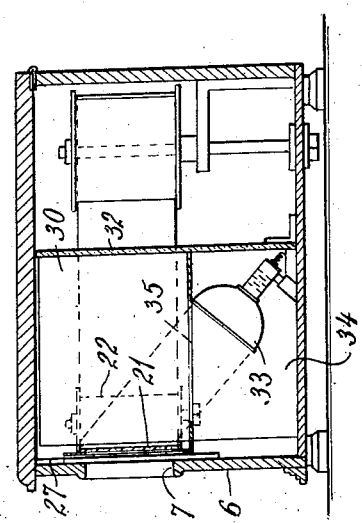
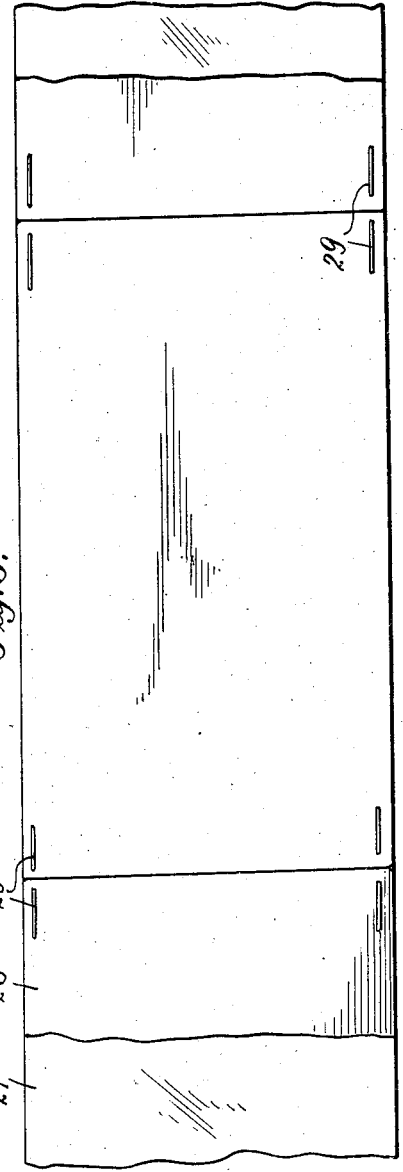
INVENTOR
Harry V. Van Nuys
BY
his ATTORNEYS Patented Aug. 9, 1927.

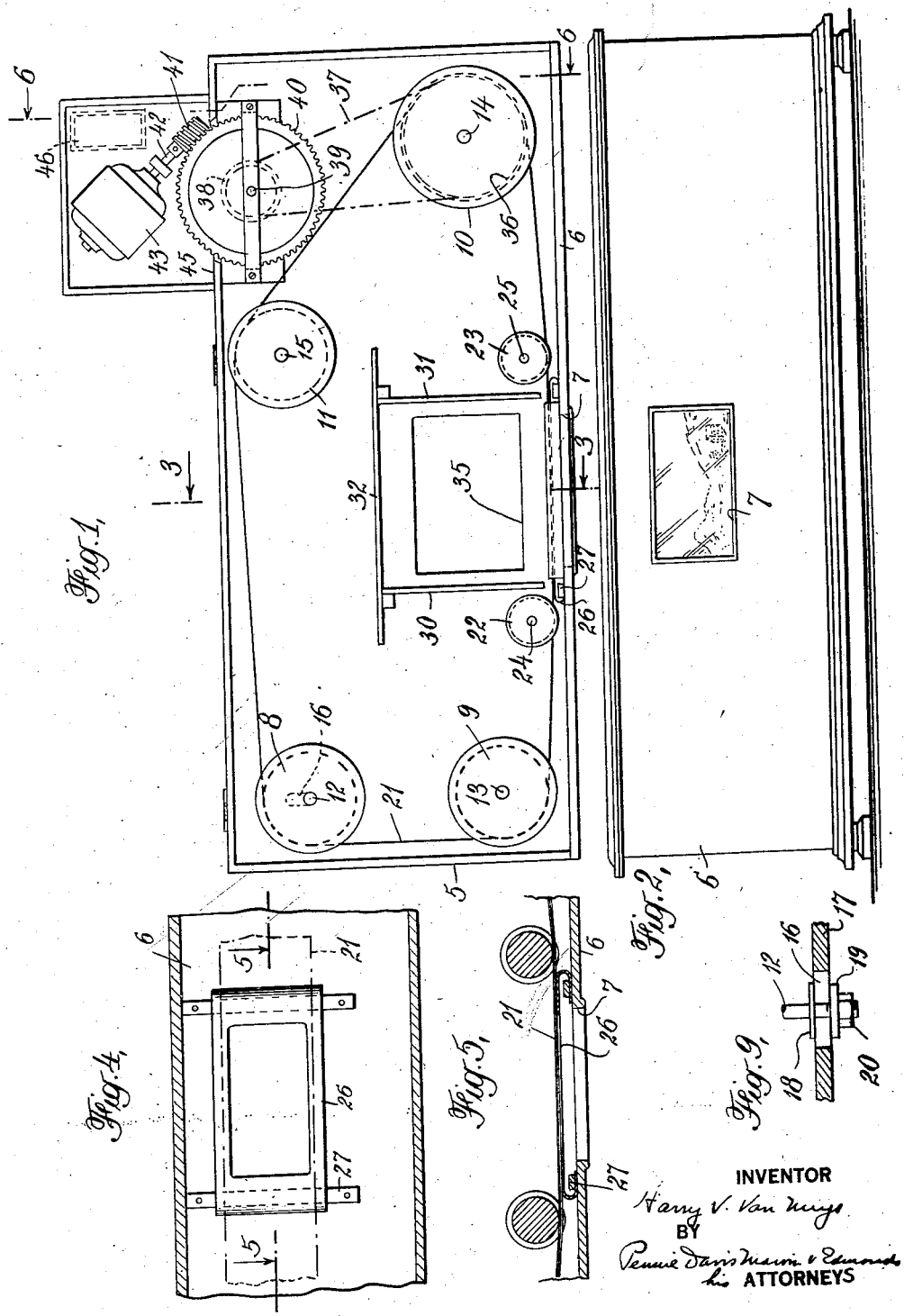

1,638,464

UNITED STATES PATENT OFFICE.

HARRY V. VAN NUYS, OF CHICAGO, ILLINOIS.

EXHIBITOR.

Application filed June 11, 1925. Serial No. 36,434.

This invention relates to exhibitors and is adapted particularly to permit the consecutive display of photographs developed in positive upon a film and illuminated from the rear thereof so that the detail of the pictures can be observed readily. Although designed primarily for the purpose indicated, the exhibitor can be utilized for general exhibition purposes.
Exhibitors of various kinds have been known heretofore but the consecutive exhibition of photographs in such devices has involved generally the preparation of prints and an arrangement for illuminating the prints from the front thereof so that they could be viewed through a suitable aperture. Exhibitors of the continuous film type have been used for displaying advertising signs, but these are not adapted for the purpose of the present invention.

It is the object of the invention to provide a simple and inexpensive exhibitor wherein a series of photographs on films can be moved consecutively past an aperture, to provide suitable illumination therefor so that the photographs are visible and to avoid distortion of the film as it passes the aperture.

Other objects and advantages of the invention will be apparent as it is better understood by reference to the following specification and the accompanying drawings, in which Fig. 1 is a horizontal section through the exhibitor;

Fig. 2 is a front elevation thereof;

Fig. 3 is a section on the line 3—3 of Fig. 1;

Fig. 4 is a detail in elevation of the aperture at the front of the exhibitor;

Fig. 5 is a section on the line 5—5 of Fig. 4;

Fig. 6 is a section on the line 6—6 of Fig. 1;

Figs. 7 and 8 indicate in plan and elevation the endless band upon which the picture films are carried; and Fig. 9 is a detail of the means for adjusting the tension of the endless band.

The film employed for photographic purposes is relatively weak and to avoid rupture thereof during the operation of the exhibitor it is necessary to provide a support. This is preferably an endless band of transparent celluloid of sufficient strength to withstand the strains to which it is subjected. The picture films are fastened to the band in any suitable manner as, for example, by the use of staples. The band is supported upon a number of drums which are adapted for rotation within a cabinet having an aperture in the front wall past which the picture films are moved. A film guide, preferably of flexible celluloid, is disposed behind the aperture in contact with the endless band to avoid curling of the band and to hold the film under a slight tension as it passes the aperture. The elasticity of the celluloid guide is sufficient for this purpose.

Illumination by placing an incandescent lamp directly behind the film is undesirable because the transparency of the film would make the lamp filament visible. Furthermore, the heat from the lamp would tend to ignite the film. Consequently a light chamber is formed behind the aperture within the cabinet by providing walls of a suitable white material adapted to act as a reflector. White porcelain or white enameled metal is preferable for this purpose. The light, which may be an electric flood lamp of the type well known in commercial illuminating work, is disposed in a light well beneath the cabinet with its ray directed into the light chamber through an aperture in the bottom of the cabinet. Sufficient illumination is thus secured without making the lamp visible or endangering the film.

The film is moved slowly past the aperture in the cabinet by the application of power from a suitable source to one of the drums. This can be accomplished readily by the provision of a small electric motor and reduction gearing so that the film is moved at the desired speed. Preferably a large gear of fibre or other suitable material to avoid noisy operation is provided and this gear is connected by means of pulleys and a round belt to the drum. A rheostat can be employed to vary the speed of operation of the motor and consequently the rate of movement of the film past the aperture. The motor is preferably housed in a chamber behind the cabinet and is separated from the interior thereof by a wall to avoid the possibility of ignition of the film by sparks generated by the motor.

The mechanism as described permits the continuous movement of the celluloid band carrying the films past the aperture at a rate which is slow enough to permit proper inspection of each picture while it is framed in the aperture. The rate of movement will vary depending upon the subject matter displayed and can be regulated at will by the operation of the rheostat.

Referring to the drawing 5 indicates a cabinet of suitable form and constructed preferably of materials to present a pleasing appearance. A panel 6 at the front of the cabinet may be made, for example, of bakelite or similar material and is provided with an aperture 7. Within the cabinet a plurality of drums 8, 9, 10 and 11 are supported on spindles 12, 13, 14 and 15 which may be secured in any desired way to the floor of the cabinet. Preferably the spindle 12 is mounted in a slot 16 in the floor 17 and is provided with a flange 18 resting thereon. A washer 19 and nut 20 permit adjustment of the spindle 12 in the slot, thus providing for movement of the drum 8 sufficient to take up any slack in the endless celluloid band 21 which is supported on the several drums. Auxiliary guide-rolls 22 and 23 are supported on spindles 24 and 25 which are mounted on the floor 17 of the cabinet adjacent the aperture 7 and serve to guide the film as it approaches and leaves the aperture. A tension device, preferably consisting of strips of celluloid 26, is supported by cleats 27 behind the aperture to resiliently support the edges of the endless band 21 as it passes the aperture. The band is thus held substantially flat and under sufficient tension to avoid distortion of the picture films 28 which are secured by staples 29, for example, to the endless band 21.

A light chamber is formed behind the aperture 7 by walls 30, 31 and 32 which are formed preferably of white porcelain or white enameled metal so as to conserve the light and to ensure proper illumination of the film. An electric flood lamp or other suitable means of illumination 33 is disposed in a light well 34 so that the ray of light is directed through an opening 35 in the bottom of the light chamber. The lamp is so disposed as to be invisible when the picture is viewed through the aperture 7. Nevertheless sufficient illumination is provided and the light is diffused so that all parts of the film are equally illuminated and the picture is thus exhibited to the greatest advantage.

The drum 10 is provided with a pulley 36 and the latter is connected preferably by a round belt with a smaller pulley 38 which is mounted on a spindle 39. The spindle is supported upon the bottom of the cabinet and carries a large gear 40 which is preferably made of fibre or other sound-deadening material to reduce the noise of operation. The gear 40 meshes with a worm gear 41 on the shaft 42 of a motor 43, the latter being supported in a housing 44 and separated from the interior of the cabinet by a wall 45 except for a slot through which the gear 40 projects. A rheostat of any suitable kind 46 is disposed within the motor housing and is connected to the motor and to the source of current. It may be operated in the usual way to control the speed of operation of the motor.

From the foregoing it will be understood that when the motor is in operation the drum 10 and consequently the band 21 carrying the picture will move continuously and the pictures will be framed consecutively in the aperture 7. As each picture is framed in the aperture it may be observed by reason of the diffused light which is projected from the light chamber through the film. A particularly beautiful effect is thus obtained when the films are carefully selected and show subjects having natural beauty such as landscapes and the like. The films may be colored with transparent dyes to enhance the effect produced by the projection of light therethrough.

Although the details as described are those preferred because of the simplicity and other advantages, various changes may be made in such details without departing from the invention or sacrificing any of the advantages thereof.

I claim:

1. In an exhibitor, the combination of a cabinet having an aperture, means for advancing a translucent film bearing pictures to be exhibited past the aperture and means at the aperture to resiliently support the edges of the film, including a strip of flexible material having its ends turned back upon itself and secured to the inner face of the wall of the cabinet adjacent the aperture.

2. In an exhibitor, the combination of a cabinet having an aperture, means for advancing a translucent film bearing pictures to be exhibited past the aperture and means for resiliently supporting said film at the aperture, said means comprising a sheet of flexible material placed over said aperture and having an opening in alignment with said aperture, and having its ends turned back upon itself and said ends being secured to the wall of said cabinet whereby the sheet of flexible material is spaced from the wall of said cabinet.

3. In an exhibitor, the combination of a cabinet having an aperture, means for advancing an endless band bearing pictures to be exhibited past the aperture, means for supporting said band at the aperture, said means comprising a flexible member secured to the cabinet for resiliently contacting with said band and guide rollers positioned adjacent said flexible member for holding said band against said flexible member.

4. In an exhibitor, the combination of a cabinet having an aperture, means for advancing a photographic film bearing pictures to be exhibited past the aperture, means for advancing with the film for protecting the film against rupture and means at the aperture for supporting the film, this means consisting of members extending along each longitudinal edge of the aperture for engaging each edge of the film from one side of the aperture to the other.

In testimony whereof I affix my signature.

HARRY V. VAN NUYS.